United States Patent Office 3,637,715
Patented Jan. 25, 1972

---

3,637,715
AMMOXIDATION OF 2-PICOLINE TO PICOLINONITRILE
Francis M. Scheidt, Midland, Mich., assignor to The Dow Chemical Company, Midland, Mich.
No Drawing. Filed Sept. 3, 1968, Ser. No. 757,121
Int. Cl. C07d 31/46
U.S. Cl. 260—294.9                              3 Claims

---

ABSTRACT OF THE DISCLOSURE

A novel and improved method for preparing 2-picolinonitrile by passing a non-flammable mixture of 2-picoline, ammonia and air at an ammoxidation temperature over a vanadium oxide catalyst.

---

BACKGROUND OF THE INVENTION

Various processes have been used for the production of 2-picolinonitrile by vapor phase catalytic ammoxidation of 2-picoline. For example, Porter et al., in U.S. Pat. 2,510,605, describe the catalytic ammoxidation of 2-picoline with ammonia and oxygen from air. Suitable catalysts there said to be useful include thorium, molybdenum, vanadium, tin, chromium, tungsten, cobalt, iron, manganese or copper, employed as the metals or the metal oxides, the oxides of aluminum, uranium, and the like, vanadates, vanadic acid and mixture of these various catalysts with each other and with other materials. The catalyst of Porter et al. (oxides of vanadium, molybdenum and phosphorus supported on alumina) said to be improved as to efficiency and yield in the ammoxidation of monoalkyl and polyalkyl pyridines, yet is shown to give a conversion of about 57 percent of alpha-picoline and a yield of about 27 mole percent of 2-picolinonitrile. D. Hadley et al., in U.S. Pat. 2,839,535, diclose the deposition of vanadium pentoxide on alumina as a support, the alumina being an activated alumina which has first been preheated within the range of 1000°–1450° C. prior to impregnation with the vanadium compound from which vanadium pentoxide is prepared. They disclose a yield of 59 percent picolinonitrile. B. Scherhag et al., in U.S. Pat. 3,297,587, describe the preparation and use of a complex solid phosphoric acid ammoxidation catalyst containing activating heavy metal compounds. In their process, a mixture of 2-picoline, ammonia, air and steam give a yield of 60 percent of 2-picolinonitrile when passed over such a catalyst in a fluidized bed reactor at 455° C.

In those processes which have been commercially used, difficulty has been experienced because of poor heat transfer with solid heterogeneous catalysts heretofore used in the ammoxidation of 2-picoline, which reaction is exothermic. Excessive localized high temperatures, so-called hot spots, form in these catalyst beds due to the poor heat transfer of their conventional catalyst supports, e.g. $Al_2O_3$, $SiO_2$ and the like, which causes sintering and reduced catalytic activity. Another source of difficulty with conventional supported catalysts is attributable to poor adhesion of the active catalytic agent to the support, whereby mechanical attrition during use causes a progressive decrease in catalytic activity. These difficulties are reflected in the relatively low yields of 2-picolinonitrile previously obtainable in the ammoxidation of 2-picoline.

It is an object of the present invention to provide an improved process for the vapor phase catalytic ammoxidation of 2-picoline. It is a further object to provide a method which avoids excessive high temperature hot spots in the catalytic ammoxidation of 2-picoline. Still a further object is to provide an improved catalytic ammoxidation procedure wherein the conversion of 2-picoline to 2-picolinonitrile is not wasteful of 2-picoline and wherein the yield of 2-picolinonitrile per pass through the catalytic reactor of 2-picoline is substantially higher than has heretofore been attainable. Other objects will be apparent from the following specification and claims.

SUMMARY OF THE INVENTION

The present invention is directed to an improved process for overcoming prior art deficiencies in the known ammoxidation of 2-picoline, which comprises passing a non-flammable mixture of 2-picoline, ammonia and an oxygen-containing gas such as air at an ammoxidation temperature over metallic vanadium or particulate silicon carbide as catalyst substrate or carrier, which substrate has a surface coating of one or more $V_2O_3$, $VO_2$ and $V_2O_5$ catalytic vanadium oxides. It is critical and essential to the practice of this invention that the finished catalyst, the combination of the vanadium oxide and the support (supported catalyst) have a specific surface ranging between 0.05 and 1. Advantages of this process are (1) substantially higher yields of 2-picolino-nitrile and (2) avoidance of excessive high temperature hot spots in the ammoxidation of 2-picoline. By vanadium metal is meant vanadium metal as such or in the form of an alloy wherein the vanadium content is at least 25 percent by weight and wherein the alloying metals are such as will not vitiate the catalytic activity of the surface oxide catalyst, e.g., ferrovanadium, which contains a preponderance of vanadium and iron and which may also include lesser amounts of other metals and aluminum-vanadium, which contains a preponderance of aluminum and vanadium and may also include lesser amounts of other metals. The vanadium metal may be particulate or in the form of reactor tubes. The silicon carbide is employed in the form of a particulate solid. When particulate vanadium metal or silicon carbide is used as catalyst support, particles ranging between about 4 and 12 U.S. mesh size are advantageous.

In the preparation of the supported vanadium oxide catalyst, vanadium metal is advantageously preheated in the presence of an oxygen-containing gas, e.g., air, at a temperature and for a time period sufficient to form at least one of the catalytic $V_2O_3$, $VO_2$ and $V_2O_5$ vanadium oxide coatings on the surface advantageously at a temperature ranging between 200° and 550° C. and a time between 3 and 18 hours. The lower oxides predominately form at the lower temperatures and shorter oxidation periods. Under such conditions, a surface coating of one or more of the oxides $V_2O_3$, $VO_2$ and $V_2O_5$ is formed and usually a mixture of all these oxides, all of which are catalytically active in the ammoxidation of 2-picoline to 2-picolinonitrile. The surface oxidation is continued for a period of time, usually about three hours or more, to give a vanadium oxide content sufficient for a conversion rate in the ammoxidation reaction of at least about 35 percent and up to about 60 percent, generally to give a vanadium oxide burden of about 1 to 10 percent.

In the application of a catalytic vanadium oxide coating to the silicon carbide support, an aqueous solution of ammonium metavanadate, $NH_4VO_3$, is poured onto the silicon carbide particles or spheres in amount and at a concentration, generally between 0.5 and 7 percent to afford a 1 to 10 percent burden of $V_2O_5$. The particles are then air dried, and the steps of treating the silicon carbide support with aqueous $NH_4VO_3$ and air drying are repeated as necessary when higher burdens of $V_2O_5$ are desired. The resulting silicon carbide containing dried $NH_4VO_3$ on its surfaces is then heated in a current of air at an elevated temperature, generally about 400° C., for a time sufficient to form a $V_2O_5$ catalytic coating.

In a convenient method, the silicon carbide particles are heated to ca. 70°–80° C. and the solution of ammonium metavanadate is then applied at a temperature of 95°–100° C. After the silicon carbide has been wetted with the heated ammonium vanadate solution, the particles are dried, advantageously in air at ca. 60° C., these steps being repeated as necessary to give higher burdens of vanadium oxide, and the resulting particles are heated in a current of air or other oxygen-containing gas up to an elevated temperature, generally about 400° C., and for a time sufficient to form a catalytic $V_2O_5$ coating which will give a conversion rate in the ammoxidation reaction of at least about 35 percent.

A catalytic $V_2O_3$- and/or $VO_2$-containing coating is ordinarily obtained during the normal use of a $V_2O_5$-coated vanadium or silicon carbide support by reduction of the $V_2O_5$ to a lower oxide form in the ammoxidation reaction. Alternatively, a $V_2O_3$- and/or a $VO_2$-coated substrate can be obtained by heating a $V_2O_5$-coated substrate in a current of ammonia at a temperature ranging between about 250° and 550° C. for a time sufficient to reduce the $V_2O_5$ to $VO_2$ or $V_2O_3$ or mixtures thereof, as determined by X-ray diffraction.

In the present process for the ammoxidation of 2-picoline, air is advantageously used as the oxygen-containing gas. The proportion of oxygen to 2-picoline and ammonia is varied so as to be outside the flammability range. The flammability range is readily determined; Limits of Flammability of Gases and Vapors, U.S. Bureau of Mines Bulletin 503 (1952): 1, 108. It depends somewhat on the molar proportion of 2-picoline to ammonia in the feed mixture, as follows. At a molar proportion of 2-picoline to ammonia of 1 to 1.5, the percent air by volume in the feed mixture should be not more than 87, while at a molar proportion of 2-picoline to ammonia of 1 to 2, the percent air by volume in the feed mixture should be not more than 72. The lowest concentration of oxygen to be used is determined by the 2-picoline conversion desired, the conversion being directly proportional to the oxygen concentration. The lower proportions of oxygen and ammonia used in the non-flammable feed mixtures of this process give increased 2-picolino-nitrile capacity of the reactor. A feed mixture of molar proportions of 2-picoline to ammonia to air of about 1:2:6 is preferred for most desirable conversion-yield characteristics.

Atmospheric, subatmospheric or superatmospheric pressure can be used in the reaction, as desired, the pressure being immaterial so long as the reactants are in the gaseous state. Substantially atmospheric pressure is preferred. When the reactants are passed through a vanadium reactor tube assembly, the geometry of which does not promote sufficient turbulence and thereby catalysis with the surface vanadium oxide, the reactor tubes are advantageously packed with an inert packing such as stainless steel distillation column packing. Alundum alumina spheres or Berl saddles or any other low surface area inert solid, i.e., having a surface area less than one square meter per gram, so that there is good mixing and contact of the reactants with the vanadium oxide surface of the reactor tubes. The vanadium tubes can also be packed with particles of silicon carbide or vanadium which have a catalytic vanadium oxide surface coating.

In carrying out the reaction, a non-flammable feed mixture of gaseous 2-picoline, ammonia and air is passed through a reactor containing particulate vanadium oxide catalyst or through a reactor having a vanadium reactor tube assembly the inner surfaces of which have a coating of one or more $V_2O_3$, $VO_2$ and $V_2O_5$ catalytic vanadium oxides at an ammoxidation temperature, preferably at a temperature of about 350° to 600° C. and 2-picolino-nitrile is recovered from the product stream. Conventional tubular reactors, e.g., consisting of a plurality of stainless steel Type 316 tubes typically having an inside diameter of about 1 to about 1.25 inches, are used with a particulate catalyst bed filling. Reactor tubes made of vanadium typically may have an inside diameter of about ⅝ to about 1.25 inches. The reactor is heated with an appropriate heating means, e.g., electric heaters, in which the temperature is controlled by one or a plurality of variable transformers. Temperature detection and control is provided, e.g., by stainless steel Type 316 coaxial thermocouple wells holding thermocouples.

There comes a time when the conversion rate of 2-picoline to 2-picolinonitrile decreases to a level calling for regeneration of catalyst, i.e., between about 20 and 30 percent conversion. At that point, the process feed is discontinued and preferably is routed to a standby reactor, and the exhausted catalyst is regenerated by passing air through the reactor containing it at a vanadium oxide forming temperature, e.g., ca. 200° to 550° C. for a time sufficient to restore the catalytic activity. Such regeneration is applicable to all of the catalysts useful in the practice of this invention.

DESCRIPTION OF THE PREFERRED EMBODIMENTS

The following examples describe completely representative specific embodiments and the best modes contemplated by the inventor of carrying out the inventive process.

Example 1

One pound of a ferrovanadium alloy containing about 75 weight percent vanadium, 15 weight percent iron and minor to trace amounts of other elements is broken into pieces mostly within the range of ca. 4 to 8 U.S. mesh sizes. These pieces are heated in an electric muffle furnace at 500° to 505° C. as air is passed over the surface at 2.5 cubic feet per hour for three hours. The resulting catalyst has a surface coating consisting mostly of $VO_2$ with a minor proportion of $V_2O_5$. It has a surface area of 0.046 square meters per gram as determined by the BET method; Paul H. Emmett, "Catalysis," 1954, vol. I, pages 36 et seq.

Example 2

A catalyst reactor consisting of a stainless steel Type 316 tube having an inside diameter of 1.25 inches and a length of 39 inches, and provided with heating means consisting of three 1400-watt electric heaters each about 13 inches long, the temperature of each heater being controlled by a variable transformer in combination with an 0.25 inch outside diameter stainless steel Type 316 coaxial thermocouple well holding thermocouples, is charged with 110 milliliters (133 grams) of the catalyst of Example 1. A gaseous mixture of 2-picoline:ammonia:air at a rate of 3.1:6.4:20 moles, respectively, per liter of catalyst per hour is passed through the reactor during a 17-hour period. During this time, the temperature within the catalyst bed ranges between about 355° and 560° C., the hottest or maximum temperature areas ranging between 549° and 560° C. A conversion of 45.5 percent of 2-picoline is obtained with the following yields based on conversion:

TABLE A

| | |
|---|---|
| Pyridine (percent) | 7.5 |
| 2-picolino-nitrile (percent) | 84.2 |
| 2-picolin-amide (percent) | 0.3 |
| Productivity, grams 2-picolino-nitrile/liter, cat./hr. | 124 |

Example 3

A quantity of particulate 99 percent pure vanadium metal, having a balance of minor proportions of other elements, ranging between about 3½ and about 12 U.S. mesh sizes, and previously oxidized and used as an ammoxidation catalyst, is regenerated by reheating in air at 550° C. for 14 hours. The resulting catalyst has a surface area of about 0.2 square meter per gram.

It is then re-run in the reactor as in Example 2, but using a feed mixture of 2-picoline to ammonia to air of 1.7:3.8:8.5 moles per liter of catalyst per hour. Product collected during successive time periods, as given below, is analyzed with the following results.

TABLE B

| Time since regeneration (hrs.) | Temp., max. (° C.) | 2-picoline conversion [1] percent | Picolinonitrile concentration on a 2-picoline-free basis, percent |
|---|---|---|---|
| 2 | 510 | 53 | 64 |
| 15 | 510 | 51 | 89 |
| 232 | 503 | 51 | 93 |

[1] Within 4% of conversion basis, as experimentally determined.

During the 18-hour period from 26 to 44 hours of this run, total product is collected and analyzed with the following results.

TABLE C

Temp., max., ° C. _____ 502–508
2-picoline conversion percent _____ 54.6
Yields [1] on conversion, percent:
    2-picolinonitrile _____ 80
    Pyridine _____ 8.3
    Picolinamide _____ 1

[1] 96.6% carbon balance.

During the 16-hour period from 137 to 153 hours of this run, total product is collected and analyzed with the following results.

TABLE D

Temp., max., ° C. _____ 493–505
2-picoline conversion percent _____ 49.0
Yields [1] on conversion, percent:
    Pyridine _____ 5.8
    2-picolinonitrile _____ 83.5
    Picolinamide _____ 0.7

[1] 96.6% carbon balance.

Example 4

A solution of 14.5 grams $NH_4VO_3$ in 200 milliliters of deionized water at 95° to 100° C. is poured onto ca. 230 milliliters of preheated (70°–80° C.) 4–8 U.S. mesh Carborundum ® Type CMC silicon carbide pellets having a specific surface of ca. 0.2 square meter per gram. The mixture is air dried at 60° C. then heated in a current of air (2.5 cu. ft./hr.) up to 400° C. over a period of ca. one hour and maintained at 400° C. for 16 hours. The resulting $V_2O_5$ catalyst contains 1.1 percent vanadium calculated as metal, and has a surface area of 0.21 square meter per gram.

A reactor as previously described is charged with 200 milliliters, 191.3 grams, of the catalyst so prepared. The reactor is heated up to operating temperature as a stream of air (10.5 moles/liter of catalyst/hrs.) is passed through the catalyst bed. When the highest temperature in the bed is just above 250° C., 2-picoline and ammonia are also pumped into the reactor at respective rates of 1.6 and 3.3 moles/liter of catalyst/hr. The total product is trapped in two Dry Ice traps (connected in series) during three 16 hour periods. Yields are as follows:

| Catalyst age [a] (hrs.) | Temp.[b] (° C.) | 2-picoline conversion percent | Yield on conversion, percent | | |
|---|---|---|---|---|---|
| | | | Pyridine | 2-picolinonitrile | 2-picolinamide |
| 30–46 | 505–512 | 53.8 | 7.8 | 79.9 | 1.3 |
| 54–70 | 492–500 | 46.9 | 5.8 | 82.2 | 1.4 |
| 78–94 | [c]482–507 | 41.3 | 5.4 | 81.7 | 1.6 |

[a] This catalyst had been used previously in a different reactor for 217 hours with similar yields.
[b] Range of highest temperatures during 16–17 hour runs.
[c] Mostly 484°–485° C.

Example 5

An additional batch of 200 milliliters catalyst prepared as in Example 4, having a surface area of 0.08 square meter per gram is charged to the reactor and run with the following feed mixtures under similar conditions with the indicated results.

TABLE E

| Space velocity (mole/l. cat./hr.) | | | 2-picoline conversion (percent) | Yields on conversion, percent | | | Productivity (g. nitrile/l. cat./hr.) | Carbon balance (percent) |
|---|---|---|---|---|---|---|---|---|
| 2-picoline | Ammonia | Air | | Pyridine | 2-picolinonitrile | 2-picolinamide | | |
| 1.67 | 3.3 | 10.3 | 56.8 | 6.5 | 78.7 | 1.2 | 76.2 | 93.8 |
| 1.67 | 3.3 | 8.6 | 45.8 | 6.0 | 83.9 | 0.9 | 76.3 | 97.0 |
| 2.49 | 5.7 | 13.3 | 33.4 | 6.0 | 88.3 | 0.2 | 78.2 | 98.9 |

Example 6

A catalyst similar to that of Example 4, but using silicon carbide spheres as carrier is tested. Space velocities of 2-picoline:ammonia:air are 1.7:3.3:10.5 moles/liter of catalyst/hr. at 486°–505° C. During a 16-hour run, a 60.2 percent conversion of 2-picoline with yields based on 2-picoline conversion of 79.4 percent picolinonitrile, 8.8 percent pyridine and 1.2 percent picolinamide are obtained. Productivity is 80 grams picolinonitrile/liter of catalyst/hour.

Example 7

A catalyst similar to that of Example 4 is run under a low ammonia:2-picoline ratio as follows:

Space velocity (mole/l. cat./hr.):
    2-picoline _____ 1.66
    Ammonia _____ 2.4
    Air _____ 10.5
2-picoline conversion (%) _____ 49.6
Yields on conversion, percent:
    Pyridine _____ 5.8
    2-picolinonitrile _____ 81.5
    2-picolinamide _____ 1.7
Productivity (g. nitrile/l. cat./hr.) _____ 72.4

Example 8

A catalyst similar to that of Example 6 and previously used in the ammoxidation of 2-picoline is found upon X-ray analysis to have a coating on the silicon carbide spheres of $V_2O_3$, 0.9 percent calculated as vanadium. When a feedstock of 2-picoline:ammonia:air is passed through this catalyst at space velocities of 1.5:3.3:10.4 moles/liter catalyst/hour at a reaction temperature of about 300° to 522° C., there is obtained a conversion of 58 percent and concentrations in the product of 93 percent 2-picolinonitrile and 6.5 percent pyridine, 2-picoline-free basis.

What is claimed is:

1. An improved method which comprises passing a non-flammable gaseous reaction mixture of 2-picoline, ammonia and an oxygen-containing gas in proportions to form 2-picolinonitrile over a vanadium oxide catalyst at a temperature at which 2-picolinonitrile is formed, wherein the catalyst support is vanadium metal, the supported catalyst having a specific surface of 0.05 to 1 square meter per gram.

2. The method of claim 1 wherein the catalyst support is particulate vanadium metal.

3. The method of claim 1 wherein the temperature is 350° to 600° C.

References Cited

UNITED STATES PATENTS 2,861,999    11/1958    D'Alessandro _____ 260—294.9
2,846,462    8/1958    Hadley _____ 260—46.5

ALAN L. ROTMAN, Primary Examiner